United States Patent
Xi et al.

(10) Patent No.: US 8,914,078 B2
(45) Date of Patent: Dec. 16, 2014

(54) ADAPTER, ELECTRONIC DEVICE AND WIRELESS COMMUNICATION SYSTEM

(75) Inventors: Yifang Xi, Taoyuan Hsien (TW); Leyang Yang, Taoyuan Hsien (TW); Dezhi Jiao, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 192 days.

(21) Appl. No.: 13/612,465

(22) Filed: Sep. 12, 2012

(65) Prior Publication Data

US 2013/0337751 A1 Dec. 19, 2013

(30) Foreign Application Priority Data

Jun. 15, 2012 (CN) .......................... 2012 1 0199253

(51) Int. Cl.
*H04M 1/00* (2006.01)

(52) U.S. Cl.
USPC ..... 455/569.2; 455/411; 455/41.2; 455/414.1

(58) Field of Classification Search
USPC ............... 455/569.2, 411, 41.2, 414.1, 569.1, 455/66.1
See application file for complete search history.

(56) References Cited

U.S. PATENT DOCUMENTS

| | | | | |
|---|---|---|---|---|
| 6,889,065 | B2* | 5/2005 | Holmes et al. | 455/569.2 |
| 7,430,400 | B2* | 9/2008 | Russo et al. | 455/66.1 |
| 8,090,367 | B2* | 1/2012 | Kameyama | 455/426.1 |
| 8,196,168 | B1* | 6/2012 | Bryan et al. | 725/46 |
| 8,655,271 | B2* | 2/2014 | Brostrom | 455/41.1 |
| 2004/0255034 | A1* | 12/2004 | Choi | 709/229 |
| 2005/0132401 | A1* | 6/2005 | Boccon-Gibod et al. | 725/34 |
| 2005/0202853 | A1* | 9/2005 | Schmitt et al. | 455/569.2 |
| 2007/0033607 | A1* | 2/2007 | Bryan | 725/10 |
| 2007/0265033 | A1* | 11/2007 | Brostrom | 455/557 |
| 2009/0247151 | A1* | 10/2009 | Kameyama | 455/426.1 |
| 2012/0303483 | A1* | 11/2012 | Lee et al. | 705/26.41 |
| 2013/0339244 | A1* | 12/2013 | Wu et al. | 705/44 |
| 2014/0015914 | A1* | 1/2014 | Delaunay | 348/14.02 |
| 2014/0082099 | A1* | 3/2014 | Burns et al. | 709/206 |

* cited by examiner

*Primary Examiner* — Minh D Dao
(74) *Attorney, Agent, or Firm* — Tim Tingkang Xia, Esq.; Morris, Manning & Martin, LLP

(57) ABSTRACT

The present application discloses an adapter, an electronic device and a wireless communication system, wherein the adapter comprises a first information acquiring unit for acquiring adapter information of the adapter and/or electronic device information from an electronic device, and a first wireless communication unit electrically connected to the first information acquiring unit and configured to perform at least one of the following operations in a wireless way: transmitting the adapter information to the electronic device, and receiving the electronic device information from the electronic device. Various information can be communicated between the adapter and the electronic device in the present application.

22 Claims, 3 Drawing Sheets

US 8,914,078 B2

ADAPTER, ELECTRONIC DEVICE AND WIRELESS COMMUNICATION SYSTEM

CROSS REFERENCE TO RELATED APPLICATIONS

The present application claims priority under 35 U.S.C. §119 to Chinese Patent Application No. 201210199253.7, filed on Jun. 15, 2012, the entire content of which is incorporated herein by reference.

FIELD OF THE INVENTION

The present application relates to electronic device technology, and particularly to an adapter, an electronic device and a wireless communication system.

BACKGROUND OF THE INVENTION

Conventionally, adapters are used as power supply for electronic devices (for example, laptop). If communication is needed between an adapter and an electronic device, extra wires are required to be added in a power cord between the adapter and the electronic device. In this way, BOM (bill of material) cost which is more and more sensitive for people will increase, and the power cord will become heavier and thus difficult to be carried, especially in the application of low power.

Generally, as shown in FIG. 1, an adapter is connected to an electronic device via an output cable including Vo, GND and ID wires inside. The Vo and GND wires are power lines, and the adapter provides power to the electronic device through these power lines. In the art, when the adapter and the electronic device are connected, communication therebetween is set up through the ID wire. The electronic device can read some fundamental information of the adapter, including manufacturer, date of manufacture, and the maximum power it can supply. Such information is written into the adapter in advance. Thus, when the conventional adapter communicates with the electronic device through the ID wire, the transmitted information is simple and fixed, but cannot be changed and adjusted.

SUMMARY OF THE INVENTION

In order to overcome the above-mentioned deficiencies in the art, an embodiment of the present application provides an adapter, which comprises a first information acquiring unit for acquiring adapter information of the adapter and/or electronic device information from an electronic device, and a first wireless communication unit electrically connected to the first information acquiring unit and configured to perform at least one of the following operations in a wireless way:
 transmitting the adapter information to the electronic device;
 receiving the electronic device information of the electronic device.

An embodiment of the present application provides an electronic device, which comprises: a second information acquiring unit for acquiring electronic device information of the electronic device and/or adapter information from an adapter, and a second wireless communication unit electrically connected to the second information acquiring unit and configured to perform at least one of the following operations in a wireless way:
 transmitting the electronic device information to the adapter;
 receiving the adapter information from the adapter.

An embodiment of the present application further provides a wireless communication system comprising an adapter and an electronic device, wherein the adapter comprises: a first information acquiring unit for acquiring adapter information of the adapter and/or electronic device information from the electronic device, and a first wireless communication unit electrically connected to the first information acquiring unit, and the electronic device comprises a second information acquiring unit for acquiring electronic device information of the electronic device and/or the adapter information from the adapter, and a second wireless communication unit electrically connected to the second information acquiring unit, wherein the first wireless communication unit and the second wireless communication unit transmit the adapter information and/or the electronic device information in a wireless way.

From the aforementioned technical solutions, it should be known that the present application may have the advantageous effects for example, the conventional signal wire set between the adapter and the electronic device may be unnecessary because of the wireless communication therebetween, such that BOM cost may be reduced and the adapter may be more portable and easy to be carried. Compared with the art in which the electronic device can only read the fundamental information of the adapter, the adapter and the electronic device in the present application may communicate various information each other in accordance with the actual requirements, thereby realizing intelligent interaction between the adapter and the electronic device.

The above and other objects, features and advantages of the present application will become more apparent through the following description of preferred embodiments with reference to the accompanying drawings.

DESCRIPTION OF THE PREFERRED EMBODIMENTS

The embodiments of the present application will be described in detail hereinafter. It shall be noted that the embodiments described herein are only for illustration, but not to limit the present application. Moreover, in the following description, "an embodiment" or "embodiment" appeared in different places may not refer to the same embodiment. In addition, the specific feature, structure and characteristic in one or more embodiments can be combined in any appropriate way.

Figure 1:
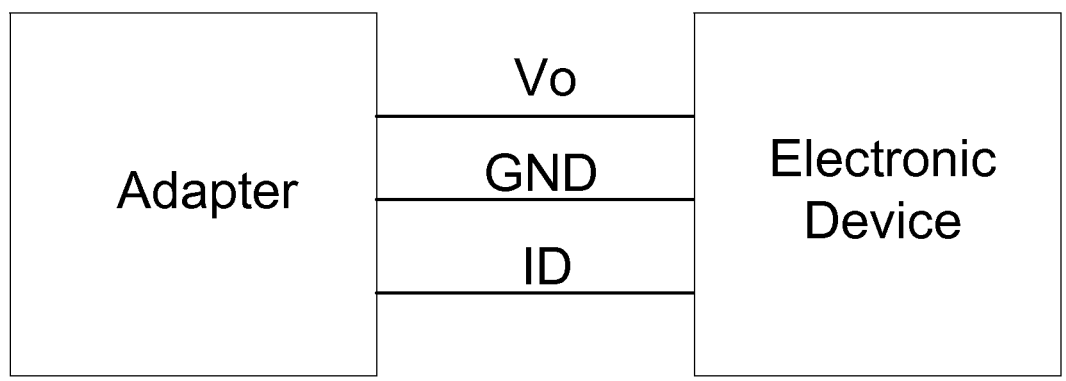
FIG. 1 is a schematic diagram illustrating the connection between a conventional adapter and an electronic device.
Figure 2:
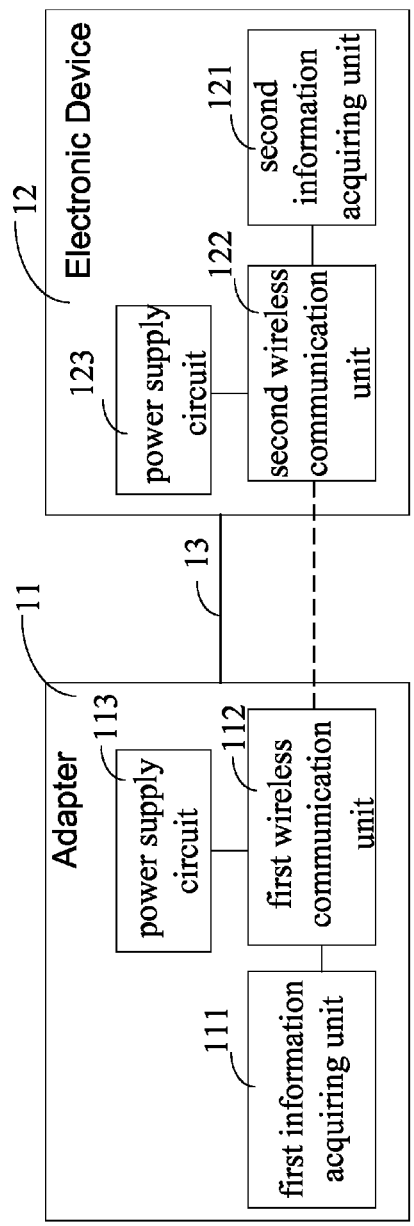
FIG. 2 is a schematic diagram illustrating the structures of an adapter and an electronic device according to an embodiment of the present application.

FIG. 2 is a schematic diagram illustrating structures of an adapter and an electronic device according to an embodiment of the present application. As shown in FIG. 2, the adapter 11 includes a first information acquiring unit 111 and a first wireless communication unit 112. The first information acquiring unit 111 is used for acquiring the adapter information of the adapter 11 and/or the electronic device information of the electronic device 12. The first wireless communication unit 112 is electrically connected to the first information acquiring unit 111, transmits the adapter information to the electronic device 12 and/or receives the electronic device information from the electronic device 12 in a wireless way.

The electronic device 12 includes a second information acquiring unit 121 and a second wireless communication unit 122. The second information acquiring unit 121 is used for acquiring the electronic device information of the electronic device 12 and/or the adapter information of the adapter 11. The second wireless communication unit 122 is electrically connected to the second information acquiring unit 121, transmits the electronic device information to the adapter 11 and/or receives the adapter information from the adapter 11 in a wireless way.

Herein, the adapter 11 and the electronic device 12 may constitute a wireless communication system. In the wireless communication system, the adapter 11 and the electronic device 12 can communicate with each other in a wireless way. For example, the adapter 11 is used as a wireless transmitting end of the system and the electronic device 12 is used as a wireless receiving end of the system, such that the adapter 11 provides corresponding adapter information to the electronic device 12. As another example, the adapter 11 is used as a wireless receiving end of the system and the electronic device 12 is used as a wireless transmitting end of the system, such that the adapter 11 receives the electronic device information from the electronic device 12. Alternatively, both the adapter 11 and the electronic device 12 can be used as a transmitting and receiving end, which transmits the information about itself and receives information from the other side simultaneously.

In the present embodiment, the adapter 11 may further include a power converter, such as an AC/DC converter (not shown), which converts AC from AC power supply to DC and provides energy to the electronic device 12 via a power cord 13 connected between the adapter 11 and the electronic device 12.

The electronic device 12 further includes a mainboard (not shown), which is used for connecting various peripheral devices of the electronic device.

In one embodiment, the first wireless communication unit 112 is a transmitting unit, which is used for transmitting the adapter information of the adapter 11 to the electronic device 12.

In another embodiment, the first wireless communication unit 112 is a receiving unit, which is used for receiving the electronic device information from the electronic device 12.

In another embodiment, the first wireless communication unit 112 is a transmitting and receiving unit, which not only transmits the adapter information of the adapter 11 to the electronic device 12 but also receives the electronic device information from the electronic device 12.

Thus, the original ID wire for signal connection between the adapter and the electronic device is unnecessary because of the wireless communication therebetween, such that the BOM cost is reduced, and the adapter is more portable and easy to be carried. Compared with the art in which the electronic device can only read the fundamental information of the adapter, various information could be communicated between the adapter and the electronic device in the present application in accordance with the actual requirements, thereby realizing the intelligent interaction between the adapter and the electronic device.

In an embodiment of the present application, the first wireless communication unit 112 in the adapter 11 may be an independent circuit independent of the power converter circuit (for example, AC/DC converter circuit) in the adapter 11, or may be arranged in the power converter circuit. Further, the first wireless communication unit 112 may be constituted by IC (Integrated Circuit) and peripheral circuit(s) of the IC, or may be constituted by discrete components.

In addition, the second wireless communication unit 122 in the electronic device 12 may be an independent circuit independent of the mainboard of the electronic device 12, or may be arranged in the mainboard. And, the second wireless communication unit 122 may be constituted by IC and peripheral circuit(s) of the IC, or may be constituted by discrete components.

The wireless communication between the first wireless communication unit 112 and the second wireless communication unit 122 may be implemented through any technique which can realize the wireless communication, for example, WiFi (Wireless Fidelity), NFC (Near Field Communication), ZigBee, UWB (Ultra Wideband), Bluetooth, RFID (Radio Frequency Identification), infrared, wireless USB, HomeRF, and the like.

In an embodiment, the adapter 11 may include a power supply circuit 113 for supplying the working power to the first wireless communication unit 112.

In an embodiment, the electronic device 12 may include a power supply circuit 123 for supplying the working power to the second wireless communication unit 122.

It should be understood by one skilled in the art that the power supply circuits 113 and 123 may be any circuit which can supply the working power to the first wireless communication unit 112 and the second wireless communication unit 122, respectively. For example, the power supply circuits 113 and 123 may be an added independent power supply circuit, or may be a part of the original circuits in the adapter 11 and the electronic device 12.

In the embodiments of the present application, the adapter 11 and the electronic device 12 have three configurations, respectively. These three configurations will be described as follows.

The first configuration is that the first wireless communication unit 112 in the adapter 11 only has wireless transmitting function and the second wireless communication unit 122 in the electronic device 12 only has wireless receiving function. In this configuration, the first wireless communication unit 112 transmits the adapter information acquired by the first information acquiring unit 111 to the second wireless communication unit 122 in the electronic device 12. On the side of the electronic device 12, the second wireless communication unit 122 receives the adapter information from the adapter 11 and provides the adapter information to the second information acquiring unit 121.

The operational mode between the adapter 11 and the electronic device 12 in the first configuration will be illustrated as follows.

If the adapter 11 is in an operating environment of full load and high temperature, a high junction temperature may be generated and thus the components might be damaged or the reliability may decrease, which condition is likely to be caused by the heavy load of the electronic device. Therefore, the first information acquiring unit 111 may acquire the overload information of the adapter 11 and provide it to the first wireless communication unit 112 as the adapter information. Then, the first wireless communication unit 112 will transmit the adapter information to the second wireless communication unit 122 of the electronic device 12 in a wireless way. Next, the second wireless communication unit 122 will transmit the adapter information to the second information acquiring unit 121. After receiving the adapter information, the second information acquiring unit 121 will inform a controller of the electronic device 12 to shut down some unnecessary procedures so as to reduce load. For example, the controller may decrease the brightness of monitor, reduce the speed of CPU, enter hibernation or sleep mode, or shut down some unnecessary periphery devices. Accordingly, the operational reliability of the adapter can be improved by the wireless communication between the adapter 11 and the electronic device 12.

In an embodiment, when the adapter 11 is overheated, the first information acquiring unit 111 collects a temperature of the most overheated component in the adapter 11 by NTC (Negative Temperature Coefficient) or PTC (Positive Temperature Coefficient) temperature sensor or thermistor, and then converts the collected temperature as the corresponding voltage value or resistance value. For example, the first information acquiring unit 111 includes a first information collection module 1111 and a first processing module 1112 which will be described below (see FIG. 3). In this case, the first information collection module 1111 may be the above-mentioned NTC temperature sensor, PTC temperature sensor, NTC thermistor or PTC thermistor, and the first processing module may be a comparator or an A/D (analog to digital) converter. When the collected temperature reaches a certain predetermined temperature, the converted voltage value or resistance value is greater than or less than a reference threshold, which triggers the comparator to invert the output voltage signal. The A/D converter transmits the corresponding control information (digital signal) to the electronic device 12 via the first wireless communication unit 112. At the electronic device 12 side, the second information acquiring unit 121 obtains the digital signal from the adapter 11 via the second wireless communication unit 122, and converts the digital signal as a level signal, then some unnecessary procedures could be shut down or the electronic device 12 could enter the sleep mode based on the converted level signal. For example, the second information acquiring unit 121 includes a second information collection module 1211 and a second processing module 1212 which will be described below (see FIG. 4). In this case, the second information collection module 1211 may be an IC chip or a MCU (Micro Control Unit) for converting a digital signal into a level signal; and the second processing module 1212 may be a CPU (Central Processing Unit) for receiving the level signal and shutting down the unnecessary procedures or making the electronic device 12 enter the sleep mode based on the level signal.

As another example, the adapter 11 may also transmit its temperature information and/or operating mode information and the like, as the adapter information, to the electronic device 12. The second information acquiring unit 121 of the electronic device 12 stores or processes such adapter information, so that the electronic device 12 can know the real-time condition of the adapter 11 and adjust the operating mode of the adapter 11 accordingly.

The adapter information transmitted by the adapter mentioned above is only for illustration. One skilled in the art can transmit various information of the adapter as the adapter information to the electronic device 12 in accordance with the actual product requirements.

Figure 3:
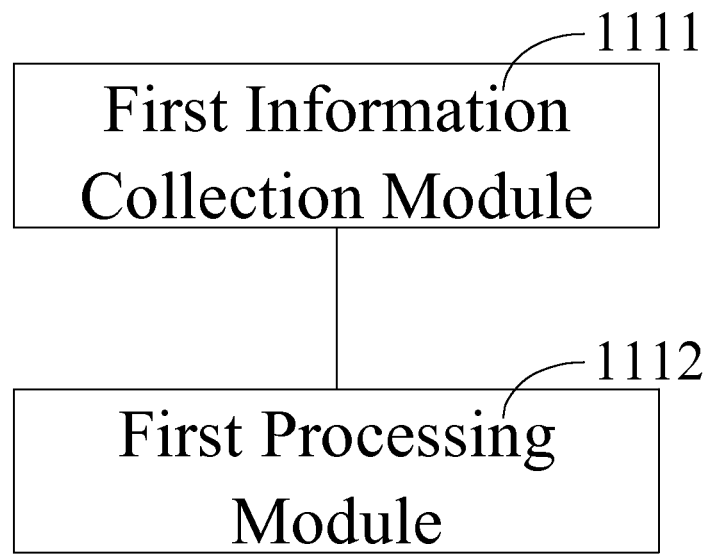
FIG. 3 is a schematic diagram illustrating the structure of a first information acquiring unit in the adapter according to an embodiment of the present application.

As shown in FIG. 3, preferably, the first information acquiring unit 111 includes the first information collection module 1111 for collecting initial information of the adapter 11; and the first processing module 1112 for processing the initial information of the adapter 11 into the adapter information. Herein, the adapter information is the information which is suitable for being received and sent by the first wireless communication unit 112. For example, the first information collection module 1111 collects temperature information or operating mode information and the like of the adapter 11 as the initial information of the adapter, and transmits such initial information of the adapter to the first processing module 1112. For example, the initial information of the adapter collected by the first information acquiring unit 1111 is analog signal. After receiving the initial information of the adapter, the first processing module 1112 processes the analog signal into digital signal which is suitable for being received and sent by the first wireless communication unit 112, and provides the digital signal as the adapter information to the first wireless communication unit 112.

The second configuration is that the first wireless communication unit 112 in the adapter 11 only has wireless receiving function and the second wireless communication unit 122 in the electronic device 12 only has wireless transmitting function. In this configuration, the first wireless communication unit 112 in the adapter 11 receives the electronic device information from the electronic device 12, and provides the electronic device information to the first information acquiring unit 111. On the side of the electronic device 12, the second wireless communication unit 122 transmits the electronic device information acquired by the second information acquiring unit 121 to the first wireless communication unit 112 of the adapter 11.

For convenience, we only describe the difference between the second configuration and the first configuration.

The operational mode between the adapter 21 and the electronic device 22 in the second configuration is illustrated as follows.

The adapter may have several OCP (Over Current Protection) points, such as two OCP points of 60w and 90w. In this case, the second information acquiring unit 121 may acquire information about the maximum load which the electronic device 12 could tolerate (i.e., maximum load information), and transmit it as the electronic device information to the first wireless communication unit 112 of the adapter 11 via the second wireless communication unit 122. Next, the first information acquiring unit 111 will determine the OCP point at the present state according to the maximum load information received from the first wireless communication unit 112. If the maximum load which the electronic device 12 could tolerate is 55w, the OCP point of the adapter can be set to 60w so as to ensure the normal operation of the adapter and save energy.

As another example, when the electronic device is in a light load (off or standby) state, the second information acquiring unit 121 can acquire such state information and transmit it as the electronic device information to the first wireless communication unit 112 of the adapter 11 via the second wireless communication unit 122. Next, the first information acquiring unit 111 informs a controller of the adapter 11 to reduce or stop power supply to the electronic device 12 according to the state information received from the first wireless communication unit 112 so as to save energy.

In addition, operating mode information of the electronic device may also be used as the electronic device information.

The electronic device information transmitted by the electronic device mentioned above is only for illustration, and one skilled in the art can transmit various information of the electronic device as the electronic device information to the adapter in accordance with the actual product requirements.

Figure 4:
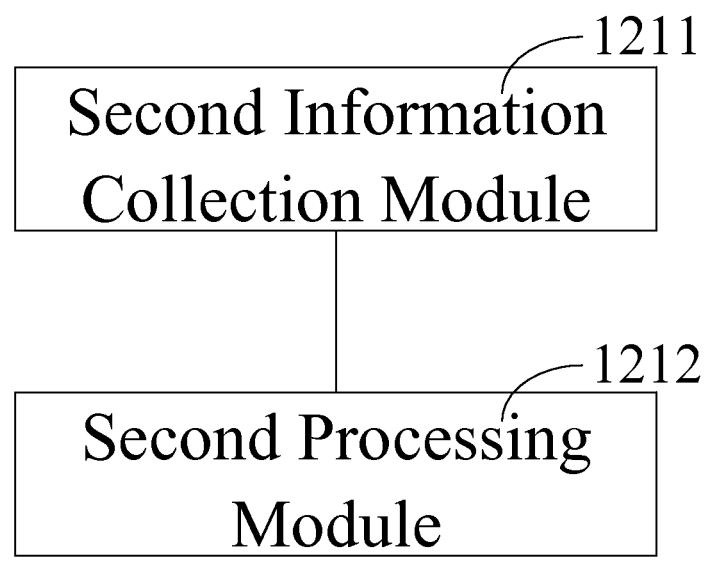
FIG. 4 is a schematic diagram illustrating the structure of a second information acquiring unit in the electronic device according to an embodiment of the present application.

As shown in FIG. 4, preferably, the second information acquiring unit 121 includes the second information collection module 1211 for collecting initial information of the electronic device 12; and the second processing module 1212 for processing the initial information of the electronic device 12 into the electronic device information. Herein, the electronic device information is the information which is suitable for being received and sent by the second wireless communication unit. For example, the second information collection module 1211 collects the maximum load information or state information and the like of the electronic device 12 as the initial information of the electronic device, and transmits them to the second processing module 1212. For example, the initial information of the electronic device collected by the second information collection module 1211 is analog signal. After receiving the initial information of the electronic device, the second processing module 1212 processes the analog signal into digital signal which is suitable for being received and sent by the second wireless communication unit 122, and provides the digital signal as the electronic device information to the second wireless communication unit 122.

The third configuration is that the first wireless communication unit 112 in the adapter 11 has wireless transmitting function and wireless receiving function, and the electronic device 12 also has wireless transmitting function and wireless receiving function.

In this configuration, on the side of the adapter 11, the first wireless communication unit 112 in the adapter 11 transmits the adapter information acquired by the first information acquiring unit 111 to the electronic device 12. In addition, when the second wireless communication unit 122 of the electronic device 12 transmits the electronic device information, the first wireless communication unit 112 receives the electronic device information and provides it to the first information acquiring unit 111.

In this configuration, on the side of the electronic device 12, the second wireless communication unit 122 in the electronic device 12 sends the electronic device information acquired by the second information acquiring unit 121 to the adapter 11. In addition, when the first wireless communication unit 112 of the adapter 11 transmits the adapter information, the second wireless communication unit 122 receives the adapter information and provides it to the second information acquiring unit 121.

It should be understood by one skilled in the art that in the third configuration, both the first wireless communication unit 112 of the adapter 11 and the second wireless communication unit 122 of the electronic device 12 have transmitting and receiving function, but they can operate in the way of only transmitting information, only receiving information or both transmitting information and receiving information. Taking the first wireless communication unit 112 as an example, it can have three operating modes: a transmitting mode, a receiving mode and a transmitting and receiving mode. When the first wireless communication unit 112 operates in the transmitting mode, the third configuration is equivalent to the above-described first configuration; and when the first wireless communication unit 112 operates in the receiving mode, the third configuration is equivalent to the above-described second configuration.

Herein, the adapter information may be the overload information, temperature information or operating mode information mentioned above, and the electronic device information may be the maximum load information, state information or operating mode information of the electronic device.

Although the present application has been described with reference to several typical embodiments, it shall be understood that the terms used herein is to illustrate rather than limit the present application. The present application can be implemented in many particular embodiments without departing from the spirit and scope of the present application, thus it shall be appreciated that the above embodiments shall not be limited to any details described above, but shall be interpreted broadly within the spirit and scope defined by the appended claims. The appended claims intend to cover all the modifications and changes falling within the scope of the appended claims and equivalents thereof.

What is claimed is:

1. An adapter, comprising:
 a first information acquiring unit for acquiring adapter information of the adapter and/or electronic device information from an electronic device,
 a first wireless communication unit electrically connected to the first information acquiring unit, and configured to perform at least one of the following operations in a wireless way:
  transmitting the adapter information to the electronic device;
  receiving the electronic device information from the electronic device, and
 a power converter which converts AC from an AC power supply to DC and provides energy to the electronic device via a power cord connected between the adapter and the electronic device.

2. The adapter according to claim 1, wherein the first information acquiring unit comprises:
 a first information collection module for collecting initial information of the adapter, and
 a first processing module for processing the initial information of the adapter into the adapter information.

3. The adapter according to claim 1, wherein the adapter information is overload information, temperature information or operating mode information of the adapter.

4. The adapter according to claim 1,
 wherein the first wireless communication unit is a circuit independent of the power converter or is arranged in the power converter.

5. The adapter according to claim 1, wherein the first wireless communication unit is a first wireless transmitting unit for transmitting the adapter information acquired by the first information acquiring unit to the electronic device.

6. The adapter according to claim 1, wherein the first wireless communication unit is a first wireless receiving unit for receiving the electronic device information from the electronic device and providing the electronic device information to the first information acquiring unit.

7. The adapter according to claim 1, wherein the first wireless communication unit is a first wireless transmitting and receiving unit for transmitting the adapter information acquired by the first information acquiring unit to the electronic device, and receiving the electronic device information from the electronic device and providing the electronic device information to the first information acquiring unit.

8. The adapter according to claim 1, wherein the wireless way comprises WiFi, NFC, ZigBee, UWB, Bluetooth, RFID, infrared, wireless USB or HomeRF.

9. An electronic device, comprising:
 a second information acquiring unit for acquiring electronic device information of the electronic device and/or adapter information from an adapter, and
 a second wireless communication unit electrically connected to the second information acquiring unit, and configured to perform at least one of the following operations in a wireless way:
  transmitting the electronic device information to the adapter;
  receiving the adapter information from the adapter, wherein the electronic device is provided with energy by the adaptor via a power cord connected between the adapter and the electronic device.

10. The electronic device according to claim 9, wherein the second information acquiring unit comprises:
   a second information collection module for collecting initial information of the electronic device, and
   a second processing module for processing the initial information of the electronic device into the electronic device information.

11. The electronic device according to claim 9, wherein the electronic device information is maximum load information, state information or operating mode information of the electronic device.

12. The electronic device according to claim 9, wherein the second wireless communication unit is a second wireless transmitting unit for transmitting the electronic device information acquired by the second information acquiring unit to the adapter.

13. The electronic device according to claim 9, wherein the second wireless communication unit is a second wireless receiving unit for receiving the adapter information from the adapter and providing the adapter information to the second information acquiring unit.

14. The electronic device according to claim 9, wherein the second wireless communication unit is a second wireless transmitting and receiving unit for transmitting the electronic device information acquired by the second information acquiring unit to the adapter, and receiving the adapter information from the adapter and providing the adapter information to the second information acquiring unit.

15. The electronic device according to claim 9, wherein the wireless way comprises WiFi, NFC, ZigBee, UWB, Bluetooth, RFID, infrared, wireless USB or HomeRF.

16. A wireless communication system comprising an adapter and an electronic device,
   wherein the adapter comprises:
      a first information acquiring unit for acquiring adapter information of the adapter and/or electronic device information from the electronic device,
      a first wireless communication unit electrically connected to the first information acquiring unit, and
      a power converter which converts AC from an AC power supply to DC and provides energy to the electronic device via a power cord connected between the adapter and the electronic device, and
   the electronic device comprises:
      a second information acquiring unit for acquiring the electronic device information of the electronic device and/or the adapter information from the adapter, and
      a second wireless communication unit electrically connected to the second information acquiring unit,
      wherein the first wireless communication unit and the second wireless communication unit transmit the adapter information and/or the electronic device information in a wireless way.

17. The wireless communication system according to claim 16, wherein the first wireless communication unit transmits the adapter information to the second wireless communication unit.

18. The wireless communication system according to claim 16, wherein the second wireless communication unit transmits the electronic device information to the first wireless communication unit.

19. The wireless communication system according to claim 16, wherein the first wireless communication unit transmits the adapter information to the second wireless communication unit, and receives the electronic device information from the second wireless communication unit.

20. The wireless communication system according to claim 16, wherein the adapter information is overload information, temperature information or operating mode information of the adapter.

21. The wireless communication system according to claim 16, wherein the electronic device information is maximum load information, state information or operating mode information of the electronic device.

22. The wireless communication system according to claim 16, wherein the first wireless communication unit and the second wireless communication unit transmit information via WiFi, NFC, ZigBee, UWB, Bluetooth, RFID, infrared, wireless USB or HomeRF.

* * * * *